United States Patent
Chen et al.

(10) Patent No.: US 11,526,246 B2
(45) Date of Patent: Dec. 13, 2022

(54) DISPLAY PANEL

(71) Applicant: Wuhan China Star Optoelectronics Semiconductor Display Technology Co., Ltd., Hubei (CN)

(72) Inventors: Bi Chen, Hubei (CN); Qibing Dai, Hubei (CN)

(73) Assignee: Wuhan China Star Optoelectronics Semiconductor Display Technology Co., Ltd., Hubei (CN)

(*) Notice: Subject to any disclaimer, the term of this patent is extended or adjusted under 35 U.S.C. 154(b) by 93 days.

(21) Appl. No.: 17/054,777

(22) PCT Filed: Jun. 30, 2020

(86) PCT No.: PCT/CN2020/099381
§ 371 (c)(1),
(2) Date: Nov. 12, 2020

(87) PCT Pub. No.: WO2021/253494
PCT Pub. Date: Dec. 23, 2021

(65) Prior Publication Data
US 2022/0187951 A1   Jun. 16, 2022

(30) Foreign Application Priority Data

Jun. 16, 2020 (CN) .................. 202010546742.X (51) Int. Cl.
*G06F 3/044* (2006.01)
*G06F 3/041* (2006.01)
(Continued)

(52) U.S. Cl.
CPC .......... *G06F 3/0446* (2019.05); *G06F 3/0412* (2013.01); *G06F 21/32* (2013.01); *G06V 40/1306* (2022.01); *G06F 2203/04111* (2013.01)

(58) Field of Classification Search
CPC ............... G06F 3/0412; G06F 3/0446; G06F 2203/04111; G06F 21/32; G06V 40/1306
See application file for complete search history.

(56) References Cited

U.S. PATENT DOCUMENTS

2017/0316249 A1* 11/2017 Lee .................. G06V 40/1365
2018/0068156 A1* 3/2018 Jang .................. G06V 40/1306
(Continued)

FOREIGN PATENT DOCUMENTS

CN   109062429   12/2018
CN   109062430   12/2018
(Continued)

*Primary Examiner* — Ryan A Lubit
(74) *Attorney, Agent, or Firm* — PV IP PC; Wei Te Chung; Ude Lu (57) ABSTRACT

A display module is provided. In the display module, a touch unit is disposed in a first display region, and the touch unit includes first touch electrodes and second touch electrodes arranged on a same layer and independently from each other; a fingerprint recognition touch unit is disposed in a second display region. The fingerprint recognition touch unit includes first recognition electrodes and second recognition electrodes arranged on a same layer and independently from each other, the first recognition electrodes and the second recognition electrodes are arranged to cross each other, and the first recognition electrodes and the first touch electrodes are arranged in different layers.

8 Claims, 3 Drawing Sheets

(51) Int. Cl.
   *G06F 21/32*     (2013.01)
   *G06V 40/13*     (2022.01)

(56) References Cited

U.S. PATENT DOCUMENTS

2018/0300007 A1* 10/2018 Xu ..................... G06F 3/0412
2018/0348937 A1* 12/2018 Pak .................... G06F 3/0443
2019/0050078 A1*  2/2019 Hamada ............... H05K 1/118

FOREIGN PATENT DOCUMENTS

| CN | 109814753 | 5/2019 |
| CN | 109857277 | 6/2019 |
| CN | 209297323 | 8/2019 |
| CN | 110427121 | 11/2019 |
| CN | 111029390 | 4/2020 |
| CN | 111261690 | 6/2020 |
| KR | 10-2019-0101042 | 8/2019 |
| WO | WO 2020/040583 | 2/2020 |

* cited by examiner

FIG. 6

DISPLAY PANEL

RELATED APPLICATIONS

This application is a National Phase of PCT Patent Application No. PCT/CN2020/099381 having International filing date of Jun. 30, 2020, which claims the benefit of priority of Chinese Patent Application No. 202010546742.X filed on Jun. 16, 2020. The contents of the above applications are all incorporated by reference as if fully set forth herein in their entirety.

FIELD AND BACKGROUND OF THE INVENTION

The present application relates to the field of display technologies, and in particular to a display panel.

With development of display technologies, mobile phones as an important communication tool are indispensable in daily life. A pursuit of maximizing a display region and integrating fingerprint recognition in the display region of a panel has become a mainstream direction.

In conventional art, the fingerprint recognition as a separate module is placed in a non-display region, such as on a front lower frame, side, or back. However, the fingerprint recognition is assembled as a separate module, which affects a screen-to-body ratio and an internal space of an entire machine.

SUMMARY OF THE INVENTION

Technical Problem

An embodiment of the present application provides a display panel to solve a technical problem that a conventional display panel assembles fingerprint identification as a separate module, thereby a screen-to-body ratio and an internal space of an entire machine.

Technical Solution

The present embodiment provides a display module, including:

a display panel including a first display region and a second display region, wherein the first display region is positioned on a periphery of the second display region;

a touch unit disposed on the first display region, wherein the touch unit includes a plurality of first touch electrodes and a plurality of second touch electrodes arranged on a same layer and independently from each other, the first touch electrodes and the second touch electrodes are arranged to cross each other; and a fingerprint recognition touch unit disposed on the second display region, wherein the fingerprint recognition touch unit includes a plurality of first recognition electrodes and a plurality of second recognition electrodes arranged on a same layer and independently from each other, the first recognition electrodes and the second recognition electrodes are arranged to cross each other, the first recognition electrodes and the first touch electrodes are arranged in different layers, and patterns of the first recognition electrodes and the second recognition electrodes are rhombuses.

In the display module of the present application, the touch unit further includes a plurality of first bridges, the first bridges and the first recognition electrodes are disposed on a same layer, and the first bridges are connected to adjacent first touch electrodes or second touch electrodes.

In the display module of the present application, the touch unit further includes a plurality of first bridges, the first bridges and the first recognition electrodes are disposed on a same layer, a portion of the first bridges is connected to adjacent first touch electrodes, and another portion of the first bridges is connected to adjacent second touch electrodes.

In the display module of the present application, the fingerprint recognition touch unit further includes a plurality of second bridges, the second bridges and the first touch electrodes are disposed on a same layer, and the second bridges are connected to adjacent first recognition electrodes or second recognition electrodes.

In the display module of the present application, the fingerprint recognition touch unit further includes a plurality of second bridges, the second bridges and the first touch electrodes are disposed on a same layer, a portion of the second bridges is connected to adjacent first recognition electrodes, and another portion of the second bridges is connected to adjacent second fingerprint second recognition electrodes.

In the display module of the present application, the display module further including a first insulating layer, a first conductive layer, a second insulating layer, a second conductive layer, and a third insulating layer sequentially disposed on the display panel, wherein the first conductive layer includes the first touch electrodes, the second touch electrodes, and the second bridges, and the second conductive layer includes the first recognition electrodes, the second recognition electrodes, and the first bridges.

In the display module of the present application, the display panel includes a plurality of light-emitting pixels, the light-emitting pixels are respectively disposed on the first display region and the second display region;

an orthographic projection of the first touch electrodes and the second touch electrodes projected on a plane where the light-emitting pixels are positioned is positioned on an outer periphery of each of the light-emitting pixels; and an orthographic projection of the first recognition electrodes and the second recognition electrodes projected on the plane where the light-emitting pixels are positioned covers at least a portion of the light-emitting pixels, wherein the first recognition electrodes and the second recognition electrodes both are made of a transparent conductive material.

In the display module of the present application, the touch unit further includes a plurality of dummy electrodes independent from each other, the dummy electrodes and the first recognition electrodes are disposed on a same layer, the dummy electrodes are disposed on the light-emitting pixels in the first display region in a one-to-one correspondence, and an orthographic projection of the dummy electrodes projected on the plane where the light-emitting pixels are positioned covers the light-emitting pixels, wherein the dummy electrodes are made of a transparent conductive material.

In the display module of the present application, an orthographic projection of the second bridges projected on the plane where the light-emitting pixels are positioned is positioned on the outer periphery of each of the light-emitting pixels, and an orthographic projection of the first bridges projected on the plane where the light-emitting pixels are positioned covers at least the portion of the light-emitting pixels.

The present application further provides a display module, including:

a display panel including a first display region and a second display region, wherein the first display region is positioned on a periphery of the second display region;

a touch unit disposed on the first display region, wherein the touch unit includes a plurality of first touch electrodes and a plurality of second touch electrodes arranged on a same layer and independently from each other, the first touch electrodes and the second touch electrodes are arranged to cross each other; and a fingerprint recognition touch unit disposed on the second display region, wherein the fingerprint recognition touch unit includes a plurality of first recognition electrodes and a plurality of second recognition electrodes arranged on a same layer and independently from each other, the first recognition electrodes and the second recognition electrodes are arranged to cross each other, and the first recognition electrodes and the first touch electrodes are arranged in different layers.

In the display module of the present application, the touch unit further includes a plurality of first bridges, the first bridges and the first recognition electrodes are disposed on a same layer, and the first bridges are connected to adjacent first touch electrodes or second touch electrodes.

In the display module of the present application, the touch unit further includes a plurality of first bridges, the first bridges and the first recognition electrodes are disposed on a same layer, a portion of the first bridges is connected to adjacent first touch electrodes, and another portion of the first bridges is connected to adjacent second touch electrodes.

In the display module of the present application, the fingerprint recognition touch unit further includes a plurality of second bridges, the second bridges and the first touch electrodes are disposed on a same layer, and the second bridges are connected to adjacent first recognition electrodes or second recognition electrodes.

In the display module of the present application, the fingerprint recognition touch unit further includes a plurality of second bridges, the second bridges and the first touch electrodes are disposed on a same layer, a portion of the second bridges is connected to adjacent first recognition electrodes, and another portion of the second bridges is connected to adjacent second recognition electrodes.

In the display module of the present application, the display module further including a first insulating layer, a first conductive layer, a second insulating layer, a second conductive layer, and a third insulating layer sequentially disposed on the display panel, wherein the first conductive layer includes the first touch electrodes, the second touch electrodes, and the second bridges, and the second conductive layer includes the first recognition electrodes, the second recognition electrodes, and the first bridges.

In the display module of the present application, the display panel includes a plurality of light-emitting pixels, the light-emitting pixels are respectively disposed on the first display region and the second display region;

an orthographic projection of the first touch electrodes and the second touch electrodes projected on a plane where the light-emitting pixels are positioned is positioned on an outer periphery of each of the light-emitting pixels; and an orthographic projection of the first recognition electrodes and the second recognition electrodes projected on the plane where the light-emitting pixels are positioned covers at least a portion of the light-emitting pixels, wherein the first recognition electrodes and the second recognition electrodes both are made of a transparent conductive material.

In the display module of the present application, the touch unit further includes a plurality of dummy electrodes independent from each other, the dummy electrodes and the first recognition electrodes are disposed on the same layer, the dummy electrodes are disposed on the light-emitting pixels in the first display region in a one-to-one correspondence, and an orthographic projection of the dummy unit s projected on the plane where the light-emitting pixels are positioned covers the light-emitting pixels, wherein the dummy electrodes are made of a transparent conductive material.

In the display module of the present application, an orthographic projection of the second bridges projected on the plane where the light-emitting pixels are positioned is positioned on the outer periphery of each of the light-emitting pixels, and an orthographic projection of the first bridges projected on the plane where the light-emitting pixels are positioned covers at least the portion of the light-emitting pixels.

In the display module of the present application, the first touch electrodes, the second touch electrodes, and the second bridges are all made of a non-transparent conductive material.

In the display module of the present application, the display module further including a plurality of first peripheral leads, a plurality of second peripheral leads, and a control module, wherein the first peripheral leads are connected to the first touch electrodes and the second touch electrodes in a one-to-one correspondence, the second peripheral leads are connected to the first recognition electrodes and the second recognition electrodes in a one-to-one correspondence, and the first peripheral leads and the second peripheral leads are electrically connected to the control module, respectively.

BENEFICIAL EFFECT

The display module of the present application integrates the fingerprint recognition touch unit and the touch unit independently in the display region and is driven and controlled by the same control module to realize an integration of recognition and touch. Specifically, the recognition electrodes of the fingerprint recognition touch unit and the touch electrodes of the touch unit are disposed in different layers to realize the integration of the fingerprint recognition touch unit and the touch unit in the display region of the display panel, thereby increasing a screen-to-body ratio and saving an installation space.

BRIEF DESCRIPTION OF THE SEVERAL VIEWS OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DESCRIPTION OF SPECIFIC EMBODIMENTS OF THE INVENTION

The following content combines with the drawings and the embodiment for describing the present application in detail. It is obvious that the following embodiments are merely some embodiments of the present application, but not all the embodiments. Based on the embodiments in the present application, for the skilled persons of ordinary skill in the art without creative effort, the other embodiments obtained thereby are still covered by the present application.

In the description of the present invention, it is to be understood that the terms such as "center", "longitudinal", "transverse", "length", "width", "thickness", "upper", "lower", "front", "rear", "left", "right", "vertical", "horizontal", "top", "bottom", "inside", "outside", "clockwise", "counterclockwise", etc., the orientation or positional relationship of the indications is based on the orientation or positional relationship shown in the drawings, and is merely for the convenience of the description of the invention and the simplified description, rather than indicating or implying that the device or component referred to has a specific orientation, in a specific orientation. The construction and operation are therefore not to be construed as limiting the invention. In addition, unless otherwise defined, any technical or scientific term used herein shall have the common meaning understood by a person of ordinary skills. Such words as "first" and "second" used in the specification and claims are merely used to differentiate different components rather than to represent any order, number or importance. In the description of the present invention, the meaning of "plurality" is two or more unless specifically defined otherwise.

In the description of this application, it should be noted that the terms "installation", "connected", and "coupled" should be understood in a broad sense, unless explicitly stated and limited otherwise. For example, they may be fixed connections, removable connected or integrally connected; it can be mechanical, electrical, or can communicate with each other; it can be directly connected, or it can be indirectly connected through an intermediate medium, it can be an internal communication of two elements or an interaction relationship of two elements. For those of ordinary skill in the art, the specific meanings of the above terms in this application can be understood according to specific situations.

In the present invention, the first feature "on" or "under" the second feature can include direct contact of the first and second features, and can also be included that the first and second features are not in direct contact but are contacted by additional features between them, unless otherwise specifically defined and defined. Moreover, the first feature is "above", "on", and "on the top of" of the second feature, including the first feature directly above and diagonally above the second feature, or simply means that the first feature is horizontally higher than the second feature. The first feature is "under", "below", and "beneath" the second feature, including the first feature directly below and diagonally below the second feature, or merely the first feature is horizontally less than the second feature.

The following disclosure provides many different implementations or examples for implementing different structures of the present application. To simplify the disclosure of the present application, the components and settings of specific examples are described below. Of course, they are merely examples and are not intended to limit the application. Furthermore, the present application may repeat reference numbers and/or reference letters in different examples, and such repetition is for the sake of simplicity and clarity, and does not by itself indicate a relationship between the various embodiments and/or settings discussed. In addition, examples of various specific processes and materials are provided in this application, but those of ordinary skill in the art can be aware of the application of other processes and/or the use of other materials.

Figure 1:
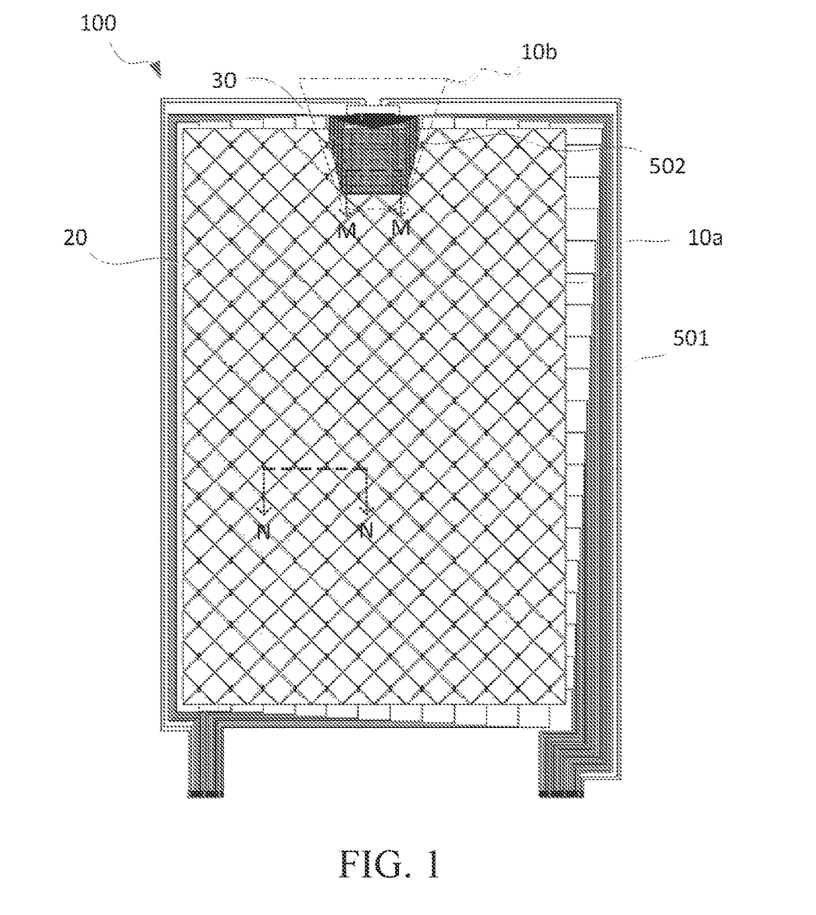
FIG. 1 is a front structural schematic diagram of a display module according to an embodiment of the present application.
Figure 2:
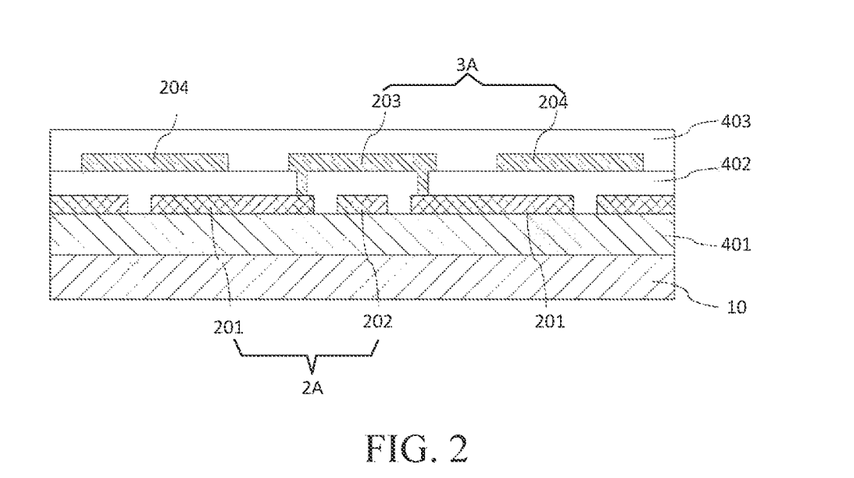
FIG. 2 is a schematic cross-sectional structure view taken along line MM in FIG. 1.
Figure 3:
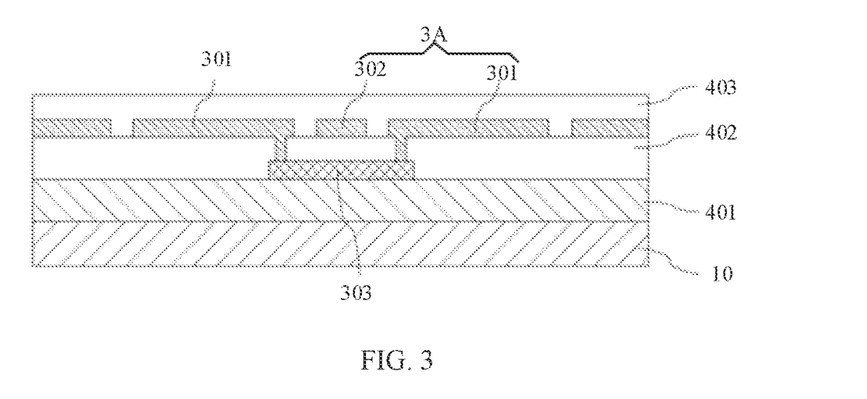
FIG. 3 is a schematic cross-sectional structure view taken along line NN in FIG. 1.

Please refer to FIG. 1 to FIG. 3, FIG. 1 is a schematic front view of a display module according to an embodiment of the present application, FIG. 2 is a schematic cross-sectional structure view taken along line MM in FIG. 1, and FIG. 3 is a schematic cross-sectional structure view taken along line NN in FIG. 1.

An embodiment of the present application provides a display module 100, which includes a display panel 10, a touch unit 20, a fingerprint recognition touch unit 30, and a control module 40.

The display panel 10 includes a first display region 10a and a second display region 10b. The first display region 10a is positioned on a periphery of the second display region 10b. The touch unit 20 is disposed on the first display region 10a. The touch unit 20 includes first touch electrodes 201 and second touch electrodes 202 arranged on a same layer and independently from each other. The first touch electrodes 201 and the second touch electrodes 202 are arranged to cross each other.

The fingerprint recognition touch unit 30 is disposed on the second display region 10b. The fingerprint recognition touch unit 30 includes first recognition electrodes 301 and second recognition electrodes 302 arranged on a same layer and independently from each other. The first recognition electrodes 301 and the second recognition electrodes 302 are arranged to cross each other. The first recognition electrodes 301 and the first touch electrodes 201 are arranged in different layers.

The display module 100 of the present application integrates the fingerprint recognition touch unit 30 and the touch unit 20 independently in the display region and is driven and controlled by a same control module 40 to realize an integration of recognition and touch. Specifically, the recognition electrodes of the fingerprint recognition touch unit 30 and the touch electrodes of the touch unit 20 are disposed in different layers to realize the integration of the fingerprint recognition touch unit 30 and the touch unit 20 in the display region of the display panel 10, thereby increasing a screen-to-body ratio and saving an installation space.

That is, in a fingerprint recognition stage, the control module 40 sends a fingerprint recognition signal to the fingerprint recognition touch unit 30 to realize a fingerprint recognition function; in a touch stage, the control module 40 sends a touch signal to the fingerprint recognition touch unit 30 and the touch unit 20 simultaneously to realize a touch control function. Of course, in some embodiments, two control modules can control the fingerprint recognition touch unit and the touch unit in one-to-one correspondence.

In the display module 100 of the present embodiment, the touch unit 20 further includes a plurality of first bridges 203, and the first bridges 203 and the first recognition electrodes 301 are disposed on a same layer. The first bridges 203 are connected to at least one of the first touch electrodes 201 and the second touch electrodes 202. That is, the first bridges 203 are connected to adjacent first touch electrodes 201 or second touch electrodes 202; or, a portion of the first bridges 203 is connected to the adjacent first touch electrodes 201, and another portion of the first bridges 203 is connected to the adjacent second touch electrodes 202.

Specifically, when the first touch electrodes 201 are arranged independent from each other, the adjacent first touch electrodes 201 can be connected through the first bridges 203; when the second touch electrodes 202 are arranged independent from each other, the adjacent second touch electrodes 202 can be connected through the first bridges 203. When a portion of the first touch electrodes 201 is arranged independent from each other and a portion of the second touch electrodes 202 is arranged independent from each other, a portion of the first bridges 203 is connected to adjacent independent first touch electrodes 201, and another portion of the first bridges 203 is connected to adjacent independent second touch electrodes 202.

In the display module 100 of the present embodiment, the first touch electrodes 201 are touch driving electrodes, and the second touch electrodes 202 are touch sensing electrodes. The first touch electrodes 201 are arranged in a same layer and independently from each other. The adjacent first touch electrodes 201 are connected through the first bridges 203. In some embodiments, the first touch electrodes 201 can also be touch sensing electrodes, and the second touch electrodes 202 can be touch driving electrodes.

Since the touch unit 20 surrounds an outer periphery of the fingerprint recognition touch unit 30, the first touch electrodes 201 provided in a row direction of the touch units 20 positioned on both sides of the fingerprint recognition touch unit 30 are electrically connected in one-to-one correspondence by windings, and a plurality of windings are arranged around the outer periphery of the fingerprint recognition touch unit 30.

In the display module 100 of the present embodiment, the fingerprint recognition touch unit 30 further includes a plurality of second bridges 303, and the second bridges 303 and the first touch electrodes 201 are disposed on a same layer. The second bridges 303 are connected to at least one of the first recognition electrodes 301 and the second recognition electrodes 302. That is, the second bridges 303 are connected to adjacent first recognition electrodes 301 or second recognition electrodes 302; or a portion of the second bridges 303 is connected to the adjacent first recognition electrodes 301, and another portion of the second bridges 303 is connected to the adjacent second recognition electrodes 302.

Specifically, when the first recognition electrodes 301 are arranged independent from each other, the adjacent first recognition electrodes 301 can be connected through the second bridges 303; and when the second recognition electrodes 302 are arranged independent from each other, the adjacent second recognition electrodes 302 can be connected through the second bridges 303. When a portion of the first recognition electrodes 301 is arranged independent from each other and a portion of the second recognition electrodes 302 is arranged independent from each other, then a portion of the second bridges 303 is connected to the adjacent independent first recognition electrodes 301, and another portion of the second bridges 303 is connected to the adjacent independent second recognition electrodes 302.

In the display module 100 of the present embodiment, the first recognition electrodes 301 are recognition driving electrodes, and the second recognition electrodes 302 are recognition sensing electrodes. A portion of the first recognition electrodes 301 in a same layer is disposed independently from each other, and a portion of the second recognition electrodes 302 is arranged independent from each other. A portion of the second bridges 303 is connected to the adjacent independent first recognition electrodes 301, and another portion of the second bridges 303 is connected to the adjacent independent second recognition electrodes 302. In some embodiments, the first recognition electrodes 301 can also be recognition sensing electrodes, and the second recognition electrodes 302 can be recognition driving electrodes.

It should be noted that, because the second bridges 303 and the electrodes of the fingerprint recognition touch unit 30 are arranged in different layers, when one of the second bridges 303 is connected to the electrodes independently from each other, the one of the second bridges 303 needs to be drilled. Compared with the electrodes directly connected at a same layer, the second bridge 303 increases a line distance of a drilling depth, thereby increasing the resistance.

Therefore, a connection setting in the fingerprint recognition touch unit 30 makes the first recognition electrodes 301 and the second recognition electrodes 302 have a balanced resistance, so that a signal response time of the first recognition electrodes 301 and the second recognition electrodes 302 tends to be same.

Specifically, the display module 100 includes a first insulating layer 401, a first conductive layer 2A, a second insulating layer 402, a second conductive layer 3A, and a third insulating layer 403, which are sequentially disposed on the display panel 10. The first conductive layer 2A includes the first touch electrodes 201, the second touch electrodes 202, and the second bridges 303, and the second conductive layer 3A includes the first recognition electrodes 301, the second recognition electrode 302, and the first bridges 203.

In some embodiments, the first insulating layer 401 can be omitted.

In some embodiments, the second conductive layer is disposed between the first insulating layer 401 and the second insulating layer 402. The first conductive layer is disposed between the second insulating layer 402 and the third insulating layer 403.

Specifically, referring to FIG. 2 and FIG. 3, the first touch electrodes 201, the second touch electrodes 202, and the second bridges 303 are all disposed between the first insulating layer 401 and the second insulating layer 402. The first recognition electrodes 301, the second recognition electrodes 302, and the first bridges 203 are all disposed between the second insulating layer 402 and the third insulating layer 403.

In the display module 100 of the present embodiment, the first touch electrodes 201, the second touch electrodes 202, and the second bridges 303 are formed by patterning the first conductive layer 2A. In some embodiments, the first touch electrodes 201, the second touch electrodes 202, and the second bridges 303 can also be formed by stepwise patterning of different conductive materials, wherein the different conductive materials are arranged in a same layer to form the first conductive layer 2A.

The first recognition electrodes 301, the second recognition electrodes 302, and the first bridges 203 are formed by patterning the second conductive layer 3A. In some embodiments, the first recognition electrodes 301, the second recognition electrodes 302, and the first bridges 203 can also be formed by stepwise patterning of different conductive materials, wherein the different conductive materials are arranged in a same layer to form the second conductive layer 3A.

Figure 4:
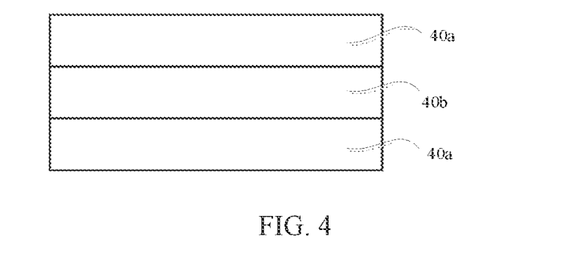
FIG. 4 is a schematic structural diagram of a second conductive layer in the display module according to an embodiment of the application.

The second conductive layer 3A is a stacked structure. The second conductive layer 3A is made of a transparent conductive material. The second conductive layer 3A includes a first conductive sub-layer 40a and a second conductive sub-layer 40b that are alternately stacked. The second conductive sub-layer 40b is disposed between the first conductive sub-layers 40a.

Specifically, referring to FIG. 4, in the present embodiment, the second conductive layer 3A includes the first conductive sub-layer 40a, the second conductive sub-layer 40b, and the first conductive sub-layer 40a, which are sequentially arranged. The first conductive sub-layer 40a is made of indium tin oxide, a thickness of the first conductive sub-layer 40a ranges from 5 nanometer (nm) to 20 nm (including 5 nm and 20 nm). The second conductive sub-layer 40b is made of metallic silver, and a thickness of the second conductive sub-layer 40b ranges from 5 nm to 30 nm (including 5 nm and 30 nm).

Material of the first conductive layer 2A is a non-transparent conductive material or a transparent conductive material. The material of the first conductive layer 2A can be gold, silver, copper, lithium, sodium, potassium, magnesium, aluminum, zinc, indium tin oxide, or any combination thereof.

Material of the insulating layer can be an organic material or an inorganic material, or a combination thereof.

Figure 5:
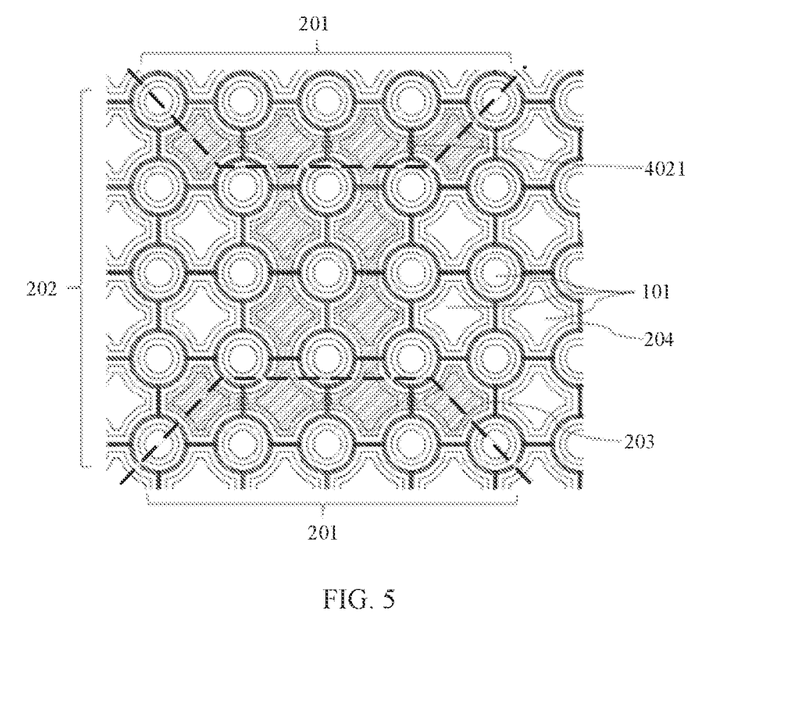
FIG. 5 is a schematic diagram of a second structure of a touch unit in a first display region of the display module according to an embodiment of the present application.
Figure 6:
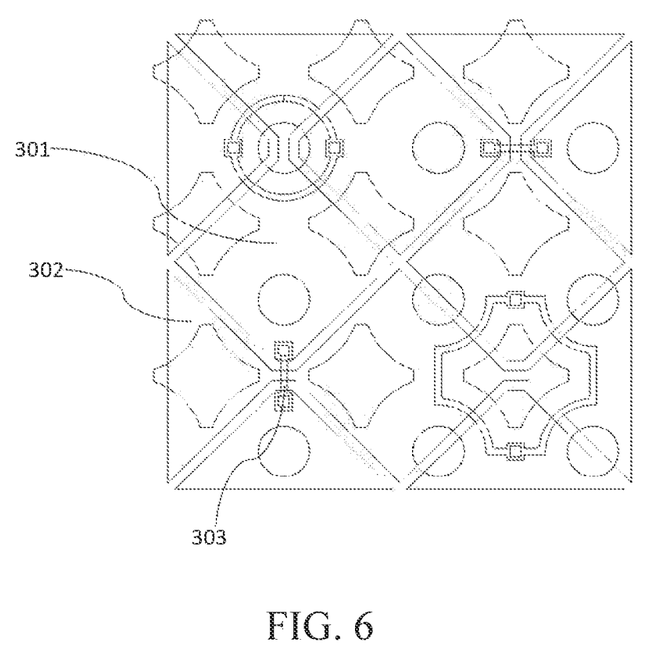
FIG. 6 is a schematic diagram of a second structure of a fingerprint recognition touch unit in a second display region of the display module according to an embodiment of the present application.

Referring to FIG. 5 and FIG. 6, in the display module 100 of the present embodiment, the display panel 10 includes a plurality of light-emitting pixels 101, and the light-emitting pixels 101 are respectively disposed on the first display region 10a and the second display region 10b.

An orthographic projection of the first touch electrodes 201 (traces in trapezoidal region defined by dotted line in FIG. 5) and the second touch electrodes 202 projected on a plane where the light-emitting pixels 101 are positioned is positioned on an outer periphery of each of the light-emitting pixels 101. That is, in the first display region 10a, the first touch electrodes 201 and the second touch electrodes 202 are respectively disposed between adjacent light-emitting pixels 101.

Each of the first bridges 203 (region marked with oblique lines in FIG. 5) includes a connection part connecting the adjacent first touch electrodes 201, and at least one intermediate part connecting between two connection parts. In the present embodiment, each connection part is connected to the first touch electrodes 201 through at least two vias 4021, which improves the stability and effectiveness of the connection. Two intermediate parts are connected between the two connection parts to improve the stability and effectiveness of a connection of the first bridges 203. Each intermediate part and the connection part are in a shape of strip, and extending directions of the both are vertically arranged.

In the present embodiment, both the first touch electrodes 201 and the second touch electrodes 202 are made of non-transparent conductive materials to save costs. In addition, the non-transparent first touch electrodes 201 and the second touch electrodes 202 are disposed between the light-emitting pixels 101 to reduce the influence on a light emission of the display panel 10.

An orthographic projection of the first recognition electrodes 301 and the second recognition electrodes 302 projected on the plane where the light-emitting pixels 101 are positioned covers at least a portion of the light-emitting pixels 101. The first recognition electrodes 301 and the second recognition electrodes 302 both are made of a transparent conductive material. An orthographic projection of the second bridges 303 projected on the plane where the light-emitting pixels 101 are positioned is positioned on the outer periphery of each of the light-emitting pixels 101.

That is, in the second display region 10b, the first recognition electrodes 301 and the second recognition electrodes 302 are both disposed on the light-emitting pixel 101, and the first recognition electrodes 301 and the second recognition electrodes 302 cover at least a portion of the light-emitting pixel 101. The second bridges 303 are arranged between the light-emitting pixels to reduce the influence on the light emission of the display panel 10.

Optionally, patterns of the first recognition electrodes 301 and the second recognition electrodes 302 are rhombuses, but not limited thereto.

In the display module 100 of the present embodiment, the touch unit 20 further includes a plurality of dummy electrodes 204 independent from each other, the dummy electrodes 204 and the first recognition electrodes 301 are disposed on a same layer, the dummy electrodes 204 are disposed on the light-emitting pixels in the first display region 10a in a one-to-one correspondence.

An orthographic projection of the dummy electrodes projected on the plane where the light-emitting pixels 101 are positioned covers the light-emitting pixels 101. The dummy electrodes are made of a transparent conductive material. That is, in the first display region 10a, the dummy electrodes 204 are correspondingly disposed on the light-emitting pixel 101, and the dummy electrodes 204 completely cover the corresponding light-emitting pixels 101. A size of each of the dummy electrodes 204 is larger than a size of one of the corresponding light-emitting pixels 101, so that an optical effect of the first display region 10a and the second display region 10b are kept consistent.

The dummy electrodes 204 can also be formed by patterning the second conductive layer.

In addition, in the display module 100 of the present embodiment, the display module 100 further includes a plurality of first peripheral leads 501 and a plurality of second peripheral leads 502. The first peripheral leads 501 are respectively connected to the first touch electrodes 201 and the second touch electrodes 202 in a one-to-one correspondence. The second peripheral leads 502 are respectively connected to the first recognition electrodes 301 and the second recognition electrodes 302 in a one-to-one correspondence. The first peripheral leads 501 and the second peripheral leads 502 are electrically connected to the control module 40, respectively.

The display module of the present application integrates the fingerprint recognition touch unit and the touch unit independently in the display region. Specifically, the recognition electrodes of the fingerprint recognition touch unit and the touch electrodes of the touch unit are disposed in different layers to realize the integration of the fingerprint recognition touch unit and the touch unit in the display region of the display panel, thereby increasing a screen-to-body ratio and saving an installation space.

The display module provided by the embodiments of the present application has been described in detail above. The present document uses specific embodiments to explain principles and implementation of the application. Descriptions of above embodiments are only used to help understand technical solutions and core ideas of the application. A person skilled in the art can make various modifications and changes to the above embodiments without departing from the technical idea of the present invention, and such variations and modifications are intended to be within the scope of the invention.

What is claimed is:

1. A display module, comprising:
    a display panel comprising a first display region and a second display region, wherein the first display region is positioned on a periphery of the second display region;
    a touch unit disposed on the first display region, wherein the touch unit comprises a plurality of first touch electrodes and a plurality of second touch electrodes arranged on a same layer and independently from each other, the first touch electrodes and the second touch electrodes are arranged to cross each other; and
    a fingerprint recognition touch unit disposed on the second display region, wherein the fingerprint recognition touch unit comprises a plurality of first recognition electrodes and a plurality of second recognition electrodes arranged on a same layer and independently from each other, the first recognition electrodes and the second recognition electrodes are arranged to cross each other, the first recognition electrodes and the first touch electrodes are arranged in different layers, and patterns of the first recognition electrodes and the second recognition electrodes are rhombuses;
    wherein the touch unit further comprises a plurality of first bridges, the first bridges and the first recognition electrodes are disposed on a same layer, and the first bridges are connected to adjacent first touch electrodes or second touch electrodes;
    wherein the fingerprint recognition touch unit further comprises a plurality of second bridges, the second bridges and the first touch electrodes are disposed on a same layer, a portion of the second bridges is connected to adjacent first recognition electrodes, and another portion of the second bridges is connected to adjacent second recognition electrodes;
    wherein the display panel comprises a plurality of light-emitting pixels, the light-emitting pixels are respectively disposed on the first display region and the second display region;
    an orthographic projection of the first touch electrodes and the second touch electrodes projected on a plane where the light-emitting pixels are positioned is positioned on an outer periphery of each of the light-emitting pixels;
    an orthographic projection of the first recognition electrodes and the second recognition electrodes projected on the plane where the light-emitting pixels are positioned covers at least a portion of the light-emitting pixels, wherein the first recognition electrodes and the second recognition electrodes both are made of a transparent conductive material the touch unit further comprises a plurality of dummy electrodes independent from each other, the dummy electrodes and the first recognition electrodes are disposed on a same layer, the dummy electrodes are disposed on the light-emitting pixels in the first display region in a one-to-one correspondence, and
    an orthographic projection of the dummy electrodes projected on the plane where the light-emitting pixels are positioned covers the light-emitting pixels, wherein the dummy electrodes are made of a transparent conductive material.

2. The display module of claim 1, further comprising a first insulating layer, a first conductive layer, a second insulating layer, a second conductive layer, and a third insulating layer sequentially disposed on the display panel, wherein the first conductive layer comprises the first touch electrodes, the second touch electrodes, and the second bridges, and the second conductive layer comprises the first recognition electrodes, the second recognition electrodes, and the first bridges.

3. The display module of claim 1, wherein an orthographic projection of the second bridges projected on the plane where the light-emitting pixels are positioned is positioned on the outer periphery of each of the light-emitting pixels, and an orthographic projection of the first bridges projected on the plane where the light-emitting pixels are positioned covers at least the portion of the light-emitting pixels.

4. A display module, comprising:
    a display panel comprising a first display region and a second display region, wherein the first display region is positioned on a periphery of the second display region;
    a touch unit disposed on the first display region, wherein the touch unit comprises a plurality of first touch electrodes and a plurality of second touch electrodes arranged on a same layer and independently from each other, the first touch electrodes and the second touch electrodes are arranged to cross each other; and
    a fingerprint recognition touch unit disposed on the second display region, wherein the fingerprint recognition touch unit comprises a plurality of first recognition electrodes and a plurality of second recognition electrodes arranged on a same layer and independently from each other, the first recognition electrodes and the second recognition electrodes are arranged to cross each other, and the first recognition electrodes and the first touch electrodes are arranged in different layers;
    wherein the touch unit further comprises a plurality of first bridges, the first bridges and the first recognition electrodes are disposed on a same layer, a portion of the first bridges is connected to adjacent first touch electrodes, and another portion of the first bridges is connected to adjacent second touch electrodes;
    wherein the fingerprint recognition touch unit further comprises a plurality of second bridges, the second bridges and the first touch electrodes are disposed on a same layer, a portion of the second bridges is connected to adjacent first recognition electrodes, and another portion of the second bridges is connected to adjacent second recognition electrodes;
    wherein the display panel comprises a plurality of light-emitting pixels, the light-emitting pixels are respectively disposed on the first display region and the second display region;
    an orthographic projection of the first touch electrodes and the second touch electrodes projected on a plane where the light-emitting pixels are positioned is positioned on an outer periphery of each of the light-emitting pixels;

an orthographic projection of the first recognition electrodes and the second recognition electrodes projected on the plane where the light-emitting pixels are positioned covers at least a portion of the light-emitting pixels, wherein the first recognition electrodes and the second recognition electrodes both are made of a transparent conductive material;

wherein the touch unit further comprises a plurality of dummy electrodes independent from each other, the dummy electrodes and the first recognition electrodes are disposed on a same layer, the dummy electrodes are disposed on the light-emitting pixels in the first display region in a one-to-one correspondence, and an orthographic projection of the dummy electrodes projected on the plane where the light-emitting pixels are positioned covers the light-emitting pixels, wherein the dummy, electrodes are made of a transparent conductive material.

5. The display module of claim 4, further comprising a first insulating layer, a first conductive layer, a second insulating layer, a second conductive layer, and a third insulating layer sequentially disposed on the display panel, wherein the first conductive layer comprises the first touch electrodes, the second touch electrodes, and the second bridges, and the second conductive layer comprises the first recognition electrodes, the second recognition electrodes, and the first bridges.

6. The display module of claim 4, further comprising a plurality of first peripheral leads, a plurality of second peripheral leads, and a control module, wherein the first peripheral leads are connected to the first touch electrodes and the second touch electrodes in a one-to-one correspondence, the second peripheral leads are connected to the first recognition electrodes and the second recognition electrodes in a one-to-one correspondence, and the first peripheral leads and the second peripheral leads are electrically connected to the control module, respectively.

7. A display module, comprising:
a display panel comprising a first display region and a second display region, wherein the first display region is positioned on a periphery of the second display region;
a touch unit disposed on the first display region wherein the touch unit comprises a plurality of first touch electrodes and a plurality of second touch electrodes arranged on a same layer and independently from each other, the first touch electrodes and the second touch electrodes are arranged to cross each other; and
a fingerprint recognition touch unit disposed on the second display region, wherein the fingerprint recognition touch unit comprises a plurality of first recognition electrodes and a plurality of second recognition electrodes arranged on a same layer and independently from each other, the first recognition electrodes and the second recognition electrodes are arranged to cross each other, and the first recognition electrodes and the first touch electrodes are arranged in different layers;

wherein the touch unit further comprises a plurality of first bridges, the first bridges and the first recognition electrodes are disposed on a same layer, a portion of the first bridges is connected to adjacent first touch electrodes, and another portion of the first bridges is connected to adjacent second touch electrodes;

wherein the fingerprint recognition touch unit further comprises a plurality of second bridges, the second bridges and the first touch electrodes are disposed on a same layer, a portion of the second bridges is connected to adjacent first recognition electrodes, and another portion of the second bridges is connected to adjacent second recognition electrodes;

wherein the display panel comprises a plurality of light-emitting pixels, the light-emitting pixels are respectively disposed on the first display region and the second display region;

an orthographic projection of the first touch electrodes and the second touch electrodes projected on a plane where the light-emitting pixels are positioned is positioned on an outer periphery of each of the light-emitting pixels;

an orthographic projection of the first recognition electrodes and the second recognition electrodes projected on the plane where the light-emitting pixels are positioned covers at least a portion of the light-emitting pixels, wherein the first recognition electrodes and the second recognition electrodes both are made of a transparent conductive material; and wherein an orthographic projection of the second bridges projected on the plane where the light-emitting pixels are positioned is positioned on the outer periphery of each of the light-emitting pixels, and an orthographic projection of the first bridges projected on the plane where the light-emitting pixels are positioned covers at least the portion of the light-emitting pixels.

8. The display module of claim 7, wherein the first touch electrodes, the second touch electrodes, and the second bridges are all made of a non-transparent conductive material.

* * * * *